(12) United States Patent
Goodwin et al.

(10) Patent No.: US 12,141,744 B1
(45) Date of Patent: Nov. 12, 2024

(54) METHOD AND SYSTEM FOR ITEM TRACKING WITH REAL-TIME FEEDBACK

(71) Applicant: C&S Wholesale Grocers, Inc., Keene, NH (US)

(72) Inventors: Andrew Goodwin, Northfield, MA (US); Ashish Aggarwal, Swanzey, NH (US); Jennifer Kircher, Rockville, MD (US); Amanda Pirner, Keene, NH (US)

(73) Assignee: C&S Wholesale Grocers, Inc., Keene, NH (US)

( * ) Notice: Subject to any disclaimer, the term of this patent is extended or adjusted under 35 U.S.C. 154(b) by 378 days.

(21) Appl. No.: 17/402,142

(22) Filed: Aug. 13, 2021

Related U.S. Application Data

(60) Provisional application No. 63/065,551, filed on Aug. 14, 2020.

(51) Int. Cl.
*G06Q 10/00* (2023.01)
*B65G 1/137* (2006.01)
*G06F 3/0482* (2013.01)
*G06K 7/14* (2006.01)
*G06Q 10/0832* (2023.01)
*G06Q 10/0833* (2023.01)
*G06Q 10/087* (2023.01)

(52) U.S. Cl.
CPC ......... *G06Q 10/087* (2013.01); *B65G 1/1373* (2013.01); *G06F 3/0482* (2013.01); *G06K 7/1413* (2013.01); *G06K 7/1417* (2013.01); *G06Q 10/0832* (2013.01); *G06Q 10/0833* (2013.01)

(58) Field of Classification Search
CPC .................. G06Q 10/087; G06Q 10/0832
USPC ............................................. 705/28
See application file for complete search history.

(56) References Cited

U.S. PATENT DOCUMENTS

| 7,768,404 B2 | 8/2010 | Flores et al. |
| 7,880,609 B2 | 2/2011 | Viegers et al. |
| 8,112,300 B2 | 2/2012 | Harper |

(Continued)

FOREIGN PATENT DOCUMENTS

| CN | 101650855 A | 2/2010 |
| WO | 2012093410 | 7/2012 |
| WO | 2019224281 A2 | 11/2019 |

OTHER PUBLICATIONS

Optimizing Warehouse Operations (Retrieved on Sep. 6, 2017 from https://devblogs.nvidia.com/parallelforall/optimizing-warehouse-operations-machine-learning-gpus/) Dec. 13, 2015.

(Continued)

*Primary Examiner* — Rokib Masud
(74) *Attorney, Agent, or Firm* — McAfee & Taft

(57) ABSTRACT

A system and method of item tracking and providing real-time feedback while one or more items are moved from one location to another location during a moving session. The system and method generate alerts to the user, allow for remote monitoring of the session by others, record the location of where the item was placed to help prevent loss or misplacement of the item. The system and method described herein enable for moving (or loading) sessions to be more efficient, reduce losses, increase safety, and raise alerts when certain thresholds are met or exceeded while items are moved to enable action to be taken in response to such alert.

26 Claims, 19 Drawing Sheets

(56) References Cited

U.S. PATENT DOCUMENTS

| | | |
|---|---|---|
| 8,429,103 B1 | 4/2013 | Aradhye et al. |
| 8,473,425 B1 | 6/2013 | Maurer et al. |
| 8,561,897 B2 | 10/2013 | Kunzig et al. |
| 8,585,347 B2 | 11/2013 | Lanigan, Sr. et al. |
| 9,286,574 B2 | 3/2016 | Gay et al. |
| 9,367,827 B1 | 6/2016 | Lively et al. |
| 9,613,335 B2 | 4/2017 | Grisson et al. |
| 9,733,633 B2 | 8/2017 | Wickham et al. |
| 9,950,862 B2 | 4/2018 | Kadaba et al. |
| 10,026,044 B1 | 7/2018 | Wurman et al. |
| 10,081,504 B2 | 9/2018 | Walford et al. |
| 10,494,205 B1 | 12/2019 | Hoofard et al. |
| 2006/0082444 A1 | 4/2006 | Sweeney, II et al. |
| 2007/0226231 A1 | 9/2007 | Venkat |
| 2008/0027834 A1 | 1/2008 | Meyer et al. |
| 2012/0019272 A1 | 7/2012 | Andersen et al. |
| 2014/0195396 A1 | 7/2014 | Bhakta et al. |
| 2014/0222522 A1 | 8/2014 | Chait |
| 2015/0356428 A1 | 10/2015 | Sanchez et al. |
| 2017/0132559 A1 | 5/2017 | Jones et al. |
| 2017/0158431 A1 | 6/2017 | Hamilton et al. |
| 2017/0206592 A1 | 7/2017 | Chen et al. |
| 2021/0032034 A1* | 2/2021 | Kalouche ............... B25J 9/1612 |

OTHER PUBLICATIONS

"Warehouse Robots" (Retrieved on Jun. 1, 2017 from https://www.theverge.com/2017/6/1/15703146/kindred-orb-robot-ai-startup-warehouse-automation) Jun. 1, 2017.

Tom Andel, "Dock and load: as the start and end point for material movement within a facility, docks offer many opportunities for speeding product flow that can have a positive impact throughout the supply chain", Material Handling Management 62.4: 24(5). Penton Media, Inc., Penton Business Media, Inc. Apr. 2007.

Gary Forger, "New Equipment Ensures Effective Dock Operators: From vehicle restraints and levelers to safety systems, dock equipment is making strides to deliver even higher levels of productivity, safety and control", Modern Materials Handling 72.10: 38(6). Peerless Media, LLC. (Oct. 2017) Oct. 2017.

"How to Achieve Amazon-like Efficiency in Your Warehouse Using Mobile Tech", Manufacturing Business Technology Advantage Business Media. (May 15, 2018) May 15, 2018.

James Pigott, "Wireless technology improves supply chain effectiveness", Pulp & Paper 82.9: 19. RISI, Inc. (Sep. 2008) Sep. 2008.

Bob Treblicock, "The path to best-in-class distribution: materials handling and warehouse software transformed Brightpoint from a reseller to the leading customized logistics provider in the wireless industry", Modern Materials Handling 61.3: 42(4). Reed Business Information, Inc. (US). (Mar. 2006) Mar. 2006.

* cited by examiner

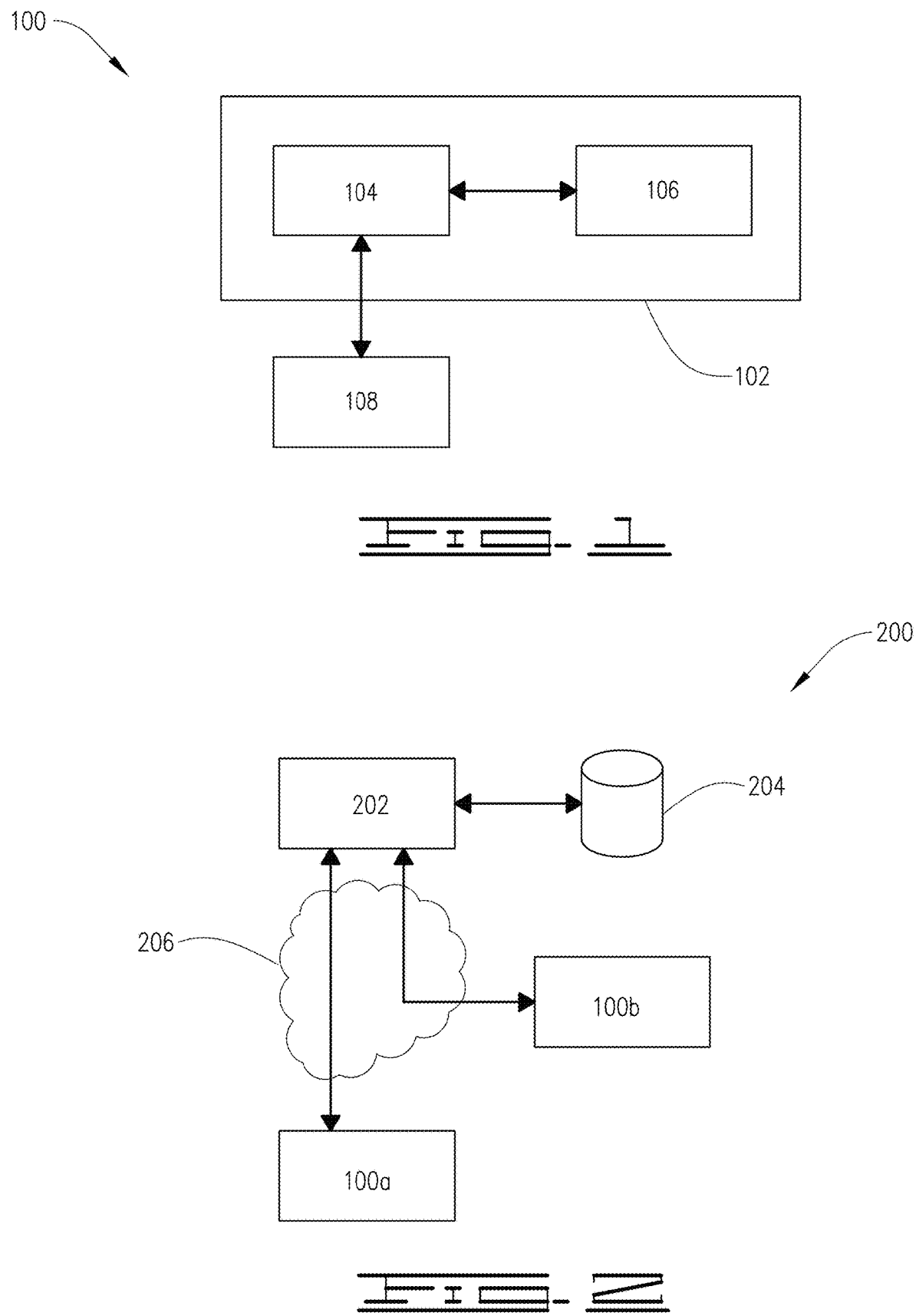

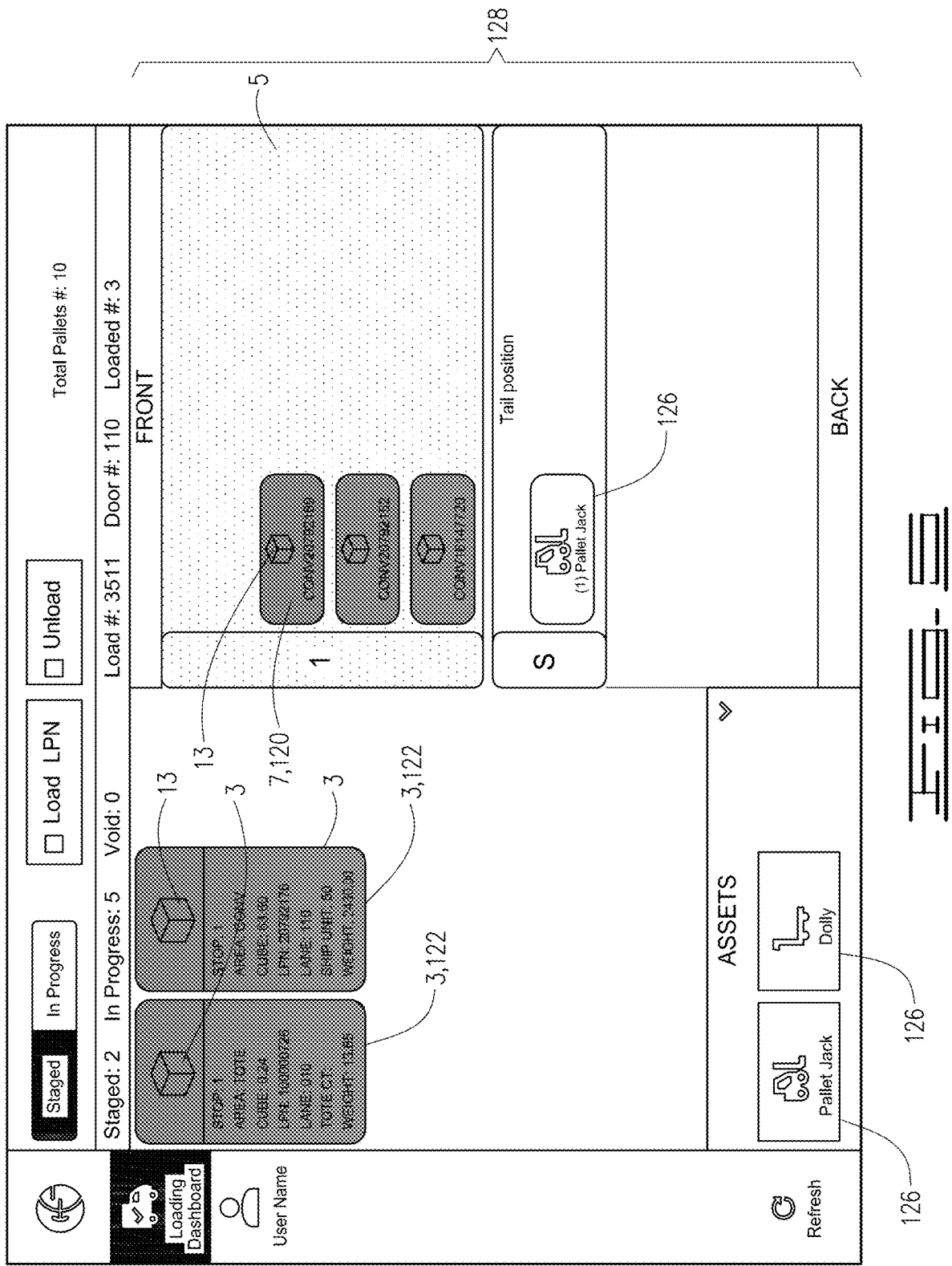

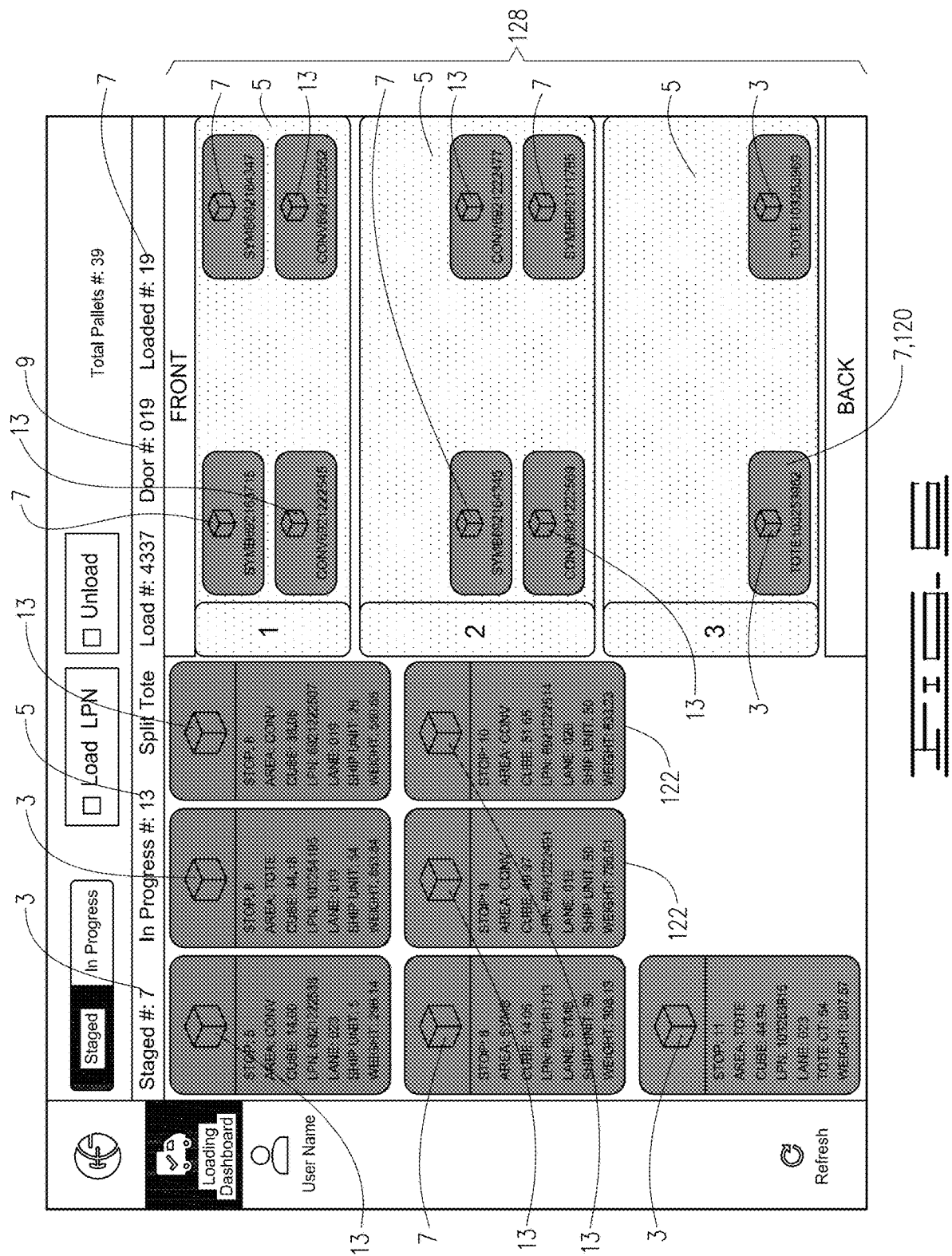

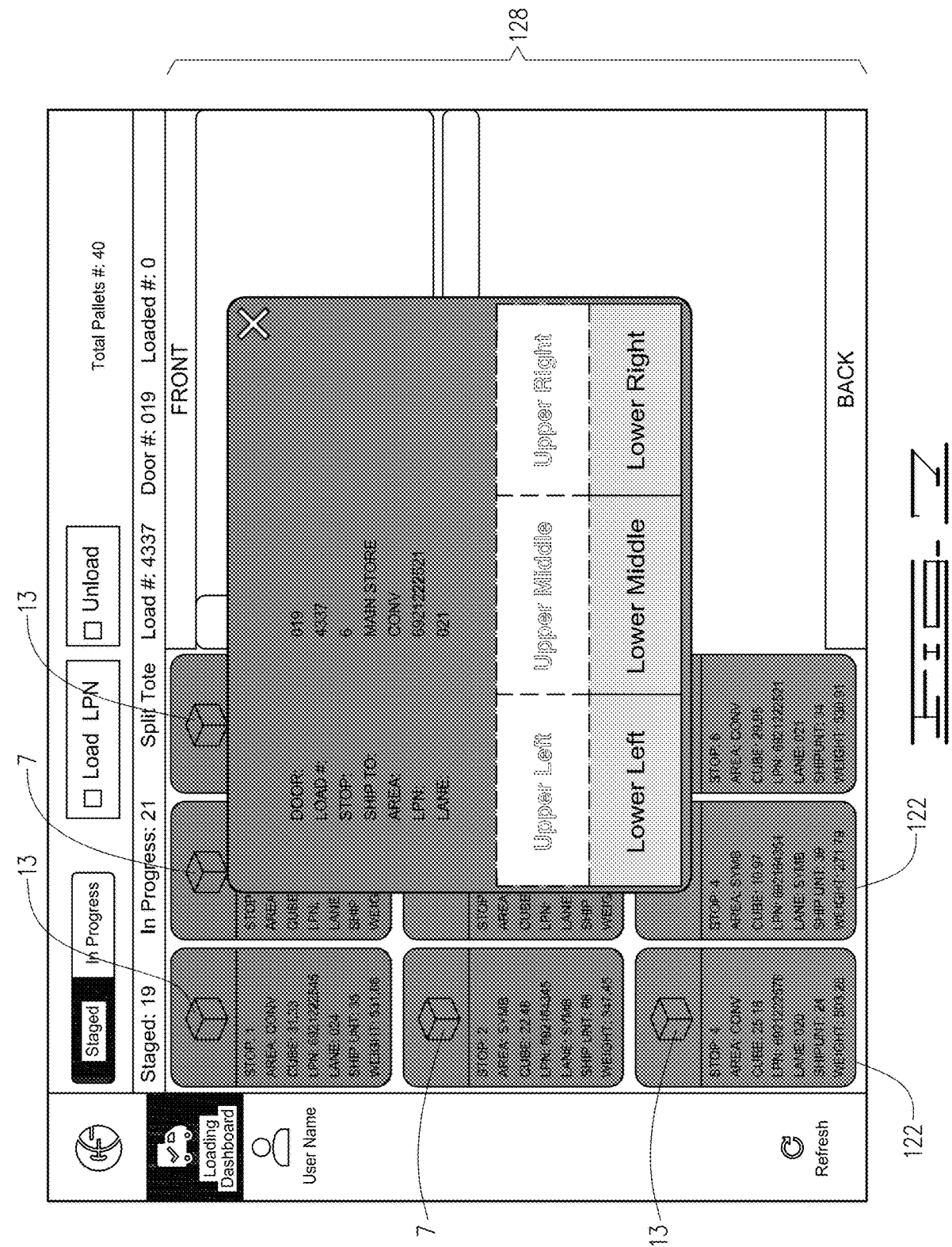

Loading Dashboard

Total Pallets #: 4

| Load # | Door | Gate Time | Nose Wt. | Tail Wt. | Loaded # | Staged # | In Progress # | Overloaded # | Stop Details |
|---|---|---|---|---|---|---|---|---|---|
| 3511 | 110 | | 6152 | 0 | 3/10 | 2/10 | 5/10 | 0 | |
| 3512 | 111 | | 34 | 0 | 9/12 | 9/12 | 2/12 | 0 | |
| 8886 | 111 | | 1243 | 0 | 0 | 0 | 0 | 1/1 | |
| 8896 | 110 | | 0 | 0 | 0 | 0 | 0 | 0 | |

☐ Load LPN

Loading Dashboard | User Name | Refresh

FIG. 5A

Loading Dashboard

| Load # | Door | Gate Time | Nose Wt. | Tail Wt. | Loaded # | Staged # | In Progress # | Overloaded # | Stop Details |
|---|---|---|---|---|---|---|---|---|---|
| 3511 | 110 | | | | | | | | 🔒 |
| 3512 | 111 | | | | | | | | 🔒 |
| 8886 | 111 | | | | | | | | 🔒 |
| 8896 | 110 | | | | | | | | 🔒 |

☐ Load LPN

Load # 3511    Door # 110    Total Pallets #: 4    ✕

| Stop | Customer Name | Store Number | Address | Status |
|---|---|---|---|---|
| Stop 1 | | 01030 | | 0/4 |
| Stop 2 | | 01090 | | 3/6 |

User Name | Refresh

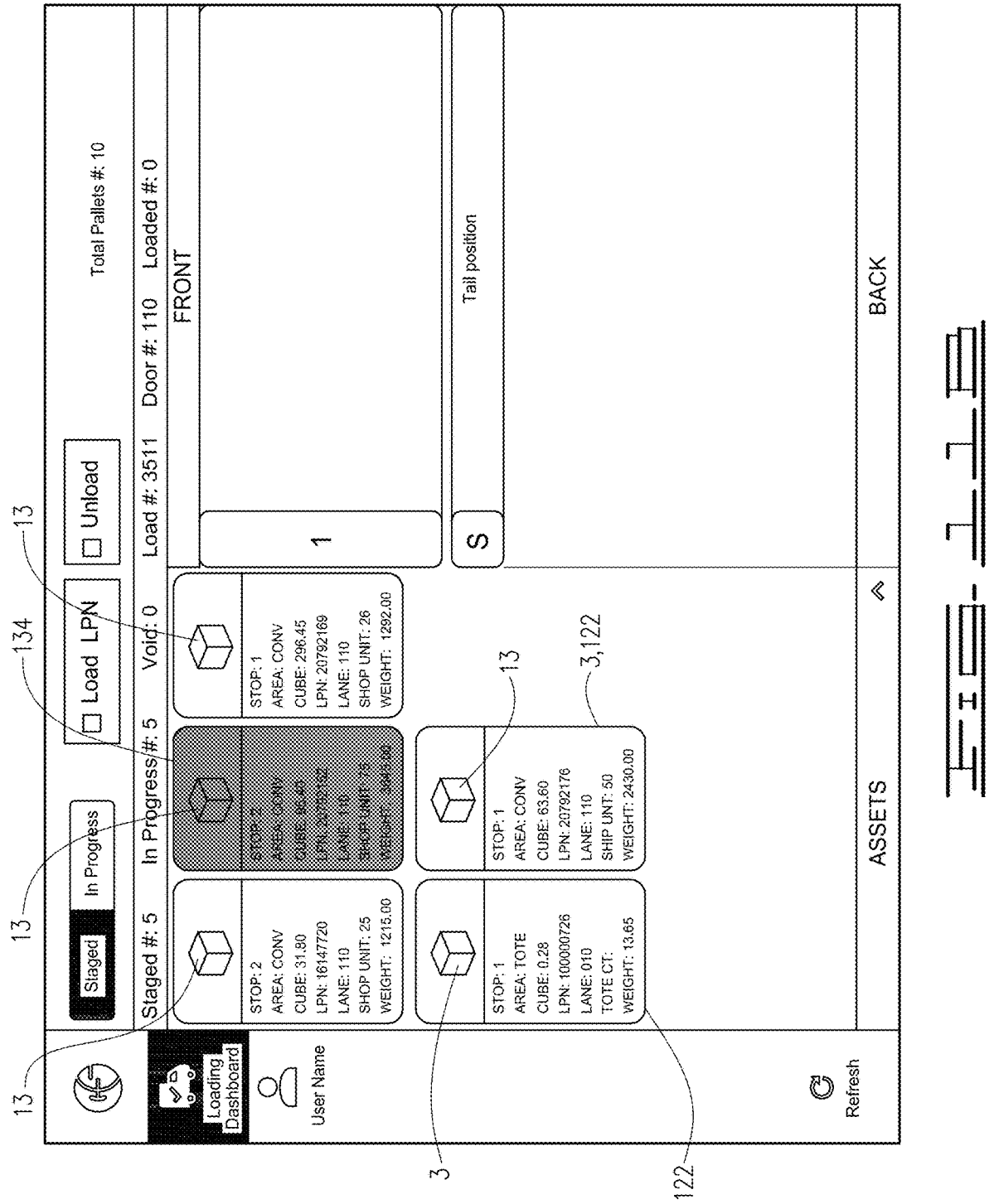

| DO... | GATE_TIME | TIEBACK | TOT... | STOP STATUS | | | | | | TAIL WT. | NOSE... |
|---|---|---|---|---|---|---|---|---|---|---|---|
| 335 | 23, 02:30 A.M. | 33301978 | 29 | STOP 2 (10/16) | STOP 1 (10/13) | | | | | 0 | 2371 |
| 336 | 17, 10:00 A.M. | 33312714 | 16 | STOP 2 (0/15) | STOP 1 (0/1) | | | | | 0 | 0 |
| 339 | 16, 09:30 A.M. | 33301812 | 50 | STOP 4 (18/16) | STOP 1 (14/18) | STOP 2 | | | | 7140 | 6222 |
| 341 | 17, 08:00 A.M. | 33305614 | 16 | STOP 1 (0/16) | | | | | | 0 | 0 |
| 342 | 17, 10:00 A.M. | 33312710 | 17 | STOP 1 (0/17) | | | | | | 0 | 0 |
| 346 | 17, 08:00 A.M. | 33302916 | 19 | STOP 1 (0/19) | | | | | | 0 | 0 |
| 349 | 17, 09:15 A.M. | 33312534 | 11 | STOP 4 (0/4) | STOP 1 (0/1) | STOP 2 (0/3) | ST... | | | 0 | 0 |
| 350 | 16, 09:30 A.M. | 33301904 | 42 | STOP 3 (15/15) | STOP 1 (5/8) | STOP 2 (6/7) | | | | 5022 | 6791 |
| 352 | 17, 09:15 A.M. | 33312750 | 16 | STOP 1 (0/16) | | | | | | 0 | 0 |
| 357 | 17, 08:30 A.M. | 33302672 | 20 | STOP 2 (0/8) | STOP 1 (0/12) | | | | | 0 | 0 |
| 358 | 17, 09:15 A.M. | 33312536 | 22 | STOP 1 (0/22) | | | | | | 0 | 0 |
| 359 | 17, 02:30 A.M. | 33313128 | 24 | STOP 1 (0/24) | | | | | | 0 | 0 |
| 361 | 17, 03:15 A.M. | 33315412 | 2 | STOP 1 (0/2) | | | | | | 0 | 0 |
| 363 | 16, 09:30 A.M. | 33301928 | 44 | STOP 3 (7/9) | STOP 1 (0/4) | STOP 2 (0/11)... | | | | 0 | 3018 |
| 365 | 23, 09:30 A.M. | 33301896 | 37 | STOP 3 (7/9) | STOP 1 (9/12) | STOP 2 (13/... | | | | 774 | 5134 |
| 366 | 17, 09:00 A.M. | 33302908 | 22 | STOP 3 (0/7) | STOP 1 (9/12) | STOP 2 (0/10) | | | | 0 | 0 |
| 368 | 23, 09:30 A.M. | 33301912 | 30 | STOP 2 (13/15) | STOP 1 (10/15) | | | | | 0 | 3028 |
| 369 | 17, 09:30 A.M. | 33312620 | 24 | STOP 2 (0/11) | STOP 1 (0/13) | | | | | 0 | 0 |

FIG. 13

METHOD AND SYSTEM FOR ITEM TRACKING WITH REAL-TIME FEEDBACK

CROSS-REFERENCE TO RELATED APPLICATION

This application claims the benefit of prior-filed U.S. provisional application No. 63/065,551, filed on Aug. 14, 2020, the entirety of which is incorporated by reference herein.

TECHNICAL FIELD

The present disclosure relates generally to systems and methods for providing real-time feedback while one or more items are moved from one location to another during a moving session, generates alerts to the user, allows for remote monitoring of the session by others, and records the location of where the item was placed to help prevent loss or misplacement of the item. The systems and methods described herein enable for moving sessions to be more efficient, reduce losses, and increase safety by raising alerts when certain thresholds are met or exceeded as items are moved to enable action to be taken in response to such alert.

BACKGROUND

For example, in relation to a warehouse environment and the loading and unloading of items at the docks, forklift drivers employ labor intensive procedures for loading and unloading pallets while simultaneously maintaining paper records of pallet loads, their progress through the warehouse and onto the trailers, and their delivery to customers. Additional employees then transcribe those paper documents to maintain warehouse records. More recently, a handheld scanner has been added to assist in the loading process. However, while both methods record the details of a loading session, the ultimate progress is still tedious, subject to error, and inefficient. Further, these methods do not allow a forklift driver to more effectively manage their loading sessions nor provide the driver with a single program or system to view information or data relevant to their loading session in a single location. For example, as a forklift driver moves items onto trailers, the driver may be required to unload and/or consolidate additional items arriving at the dock at a later time, thereby creating further inefficiencies and opportunities for misplacement or loss of items.

SUMMARY

The disclosed systems and methods allow real-time or near real-time tracking of items as they are moved from a first location to a second location, such as a confinement area, provide a visual rendering of an item, including a visual display of the position of the item in the confinement area. The present disclosure enables efficient movement and processing of an item, the ability to monitor an item, and provides the users and others the ability to monitor the progress or location of an item with real-time and current information.

A computing system comprising: one or more processors; one or more computer readable storage media operably coupled to at least one of the processors. The computing system further comprises program instructions stored on the one or more computer readable storage media for execution by at least one of the processors to cause the computing system to perform the actions of: receiving identifying information associated with an item from a scanning device, determining whether special handling of said item is required, and in response to a determination that special handling is required: displaying, via a graphical user interface, a request to be provided with identifying information corresponding to all sub-items within said item. The computing system further includes additional program instructions stored on the one or more computer readable storage media for execution by at least one of the processors to cause the computing system to perform the actions of: determining whether a provided quantity of sub-items matches an expected quantity of sub-items. In response to a determination of a mismatch between said provided quantity of sub-items and said expected quantity of sub-items, the computing system further includes additional program instructions stored on the one or more computer readable storage media for execution by at least one of the processors to cause the computing system to perform the actions of: displaying, via the graphical user interface, an indication of mismatch. In response to a determination of a match between said provided quantity of sub-items and said expected quantity of sub-items, the computing system further includes additional program instructions stored on the one or more computer readable storage media for execution by at least one of the processors to cause the computing system to perform the actions of: displaying, via the graphical user interface, a request to be provided identifying information of a confinement area. The computing system further includes additional program instructions stored on the one or more computer readable storage media for execution by at least one of the processors to cause the computing system to perform the actions of: receiving identifying information associated with said confinement area from the scanning device; displaying, via a graphical user interface, a visual depiction of one or more available positions for said item within said confinement area; and receiving an indication of a selection of a position selected from the visual depiction of the one or more available positions within said confinement area. In response to receiving said indication of a selection of a position selected from the visual depiction of the one or more available positions, the computing system further includes additional program instructions stored on the one or more computer readable storage media for execution by at least one of the processors to cause the computing system to perform the actions of: determining whether a weight threshold associated with said confinement area is met or exceeded, and in response to a determination a weight threshold is met or exceeded, displaying, via the graphical user interface, an indication that said weight threshold is met or exceeded.

A computer-implemented method of tracking an item as it is moved to a confinement area, the method comprising: receiving, by a computing system executing a loading software application, identifying information associated with an item. The method further includes determining, by the computing system executing the loading software application, whether special handling of said item is required, and in response to a determination that special handling is required: displaying, via a graphical user interface, a request to be provided with identifying information corresponding to all sub-items within said item. The method further includes determining, by the computing system executing the loading software application, whether a provided quantity of sub-items matches an expected quantity of sub-items, wherein the expected quantity of sub-items is the quantity of sub-items in said characteristic data associated with said item. In response to determining a match between said provided quantity of sub-items and said expected quantity of sub-items, the method includes: displaying, via the graphical user interface, a request to be provided identifying information of a confinement area. The method further includes receiving, by the computing system executing the loading software application, identifying information associated with said confinement area; displaying, via a graphical user interface, a visual depiction of one or more available positions for said item within said confinement area; and receiving, by the computing system executing the loading software application, an indication of a selection of a position selected from the visual depiction of the one or more available positions within said confinement area. In response to receiving said indication of a selection of a position selected from the visual depiction of the one or more available positions, the method includes determining, by the computing system executing the loading software application, whether a weight threshold associated with said confinement area is met or exceeded. In response to a determination a weight threshold is met or exceeded, the method includes: displaying, via the graphical user interface, an indication that said weight threshold is met.

A computer program product for tracking one or more items, the computer program product stored in a computer readable storage medium, comprising program code that, when executed by the computing system, cause the computing system to perform actions comprising: receiving identifying information associated with an item from a scanning device and determining whether special handling of the scanned item is required. In response to a determination that special handling is required: displaying, via a graphical user interface, a request to be provided with identifying information corresponding to all sub-items within said scanned item, and determining whether a provided quantity of sub-items matches an expected quantity of sub-items. In response to a determination of a match between said provided quantity of sub-items and said expected quantity of sub-items: displaying, via the graphical user interface, a request to be provided identifying information of a confinement area. The computer program product further includes program code that, when executed by the computing system, cause the computing system to perform actions of receiving identifying information associated with said confinement area and displaying, via the graphical user interface, a visual depiction of one or more available positions for said item within said confinement area in response to receiving identifying information associated with said confinement area. The computer program product further includes program code that, when executed by the computing system, cause the computing system to perform actions of receiving an indication of a selection of a position selected from the visual depiction of the one or more available positions within said confinement area; and determining whether a weight threshold associated with said confinement area is met or exceeded. The computer program product further includes program code that, when executed by the computing system, cause the computing system to perform actions of in response to a determination a weight threshold is met or exceeded: displaying, via the graphical user interface, an indication that said weight threshold is met or exceeded.

BRIEF DESCRIPTION OF THE DRAWINGS

The figures included with this application illustrate certain aspects of the systems, methods, and computer program products described herein. However, the figures should not be viewed as exclusive representations or limiting. The subject matter disclosed is capable of modification or alteration in form and function, as will occur to those skilled in the art with the benefit of this disclosure.

FIG. 1 depicts a simplified block diagram that shows an example of a computing system for item tracking with real-time feedback.

FIG. 2 depicts a simplified block diagram of an example of an implementation of elements of the computing system and various possible interconnections between these elements for item tracking with real-time feedback.

FIGS. 5 and 6 depicts an example visual display of the loading software application for item tracking with real-time feedback.

FIG. 8 illustrates an example illustration of the visual display of the loading software application showing items in the loading process as well as an item positioned in the confinement area.

FIGS. 9A and 9B illustrates a dashboard depicting details relating to open and closed loads, and specific details regarding a particular load, respectively.

FIGS. 11A-11C are different example renderings of the visual display screen relating to an overloaded situation and handling thereof.

FIGS. 12A-12E depict different example renderings of the visual display screen relating to a process for items requiring special handling.

FIG. 13 is another example illustration of an overview of information the computer program product is capable of conveying to one or more users.

DETAILED DESCRIPTION

Figure 3:
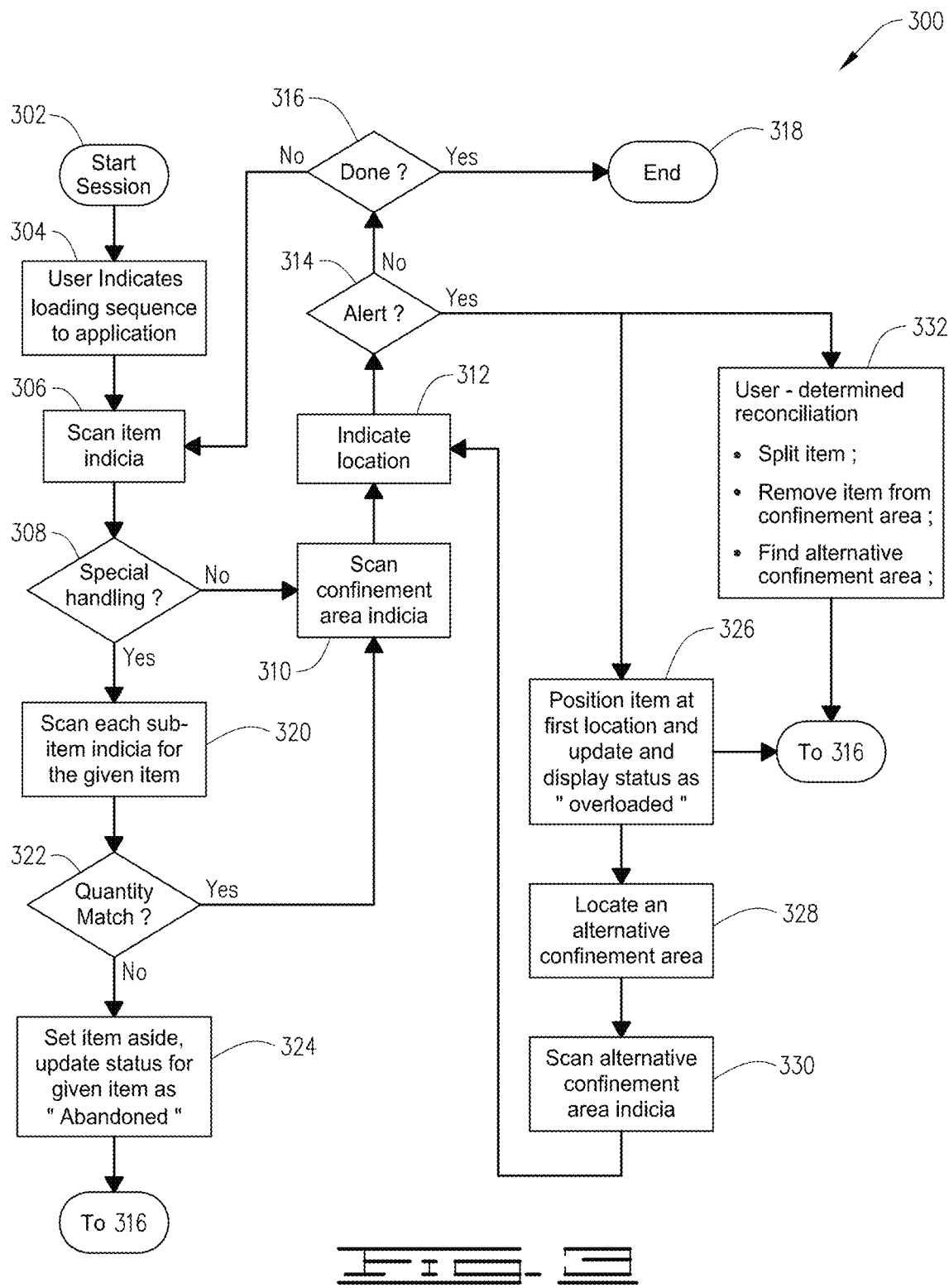
FIG. 3 depicts an example flow chart in connection with a user loading items and using a loading computer program product software application as part of the loading session for item tracking with real-time feedback.

For ease of discussion and illustration purposes only, the present disclosure is made in reference to a loading dock at a warehouse and tracking items as they are loaded onto a vehicle or trailer. Such reference to the warehouse example should not be construed as limiting the present disclosure. The disclosed processes and systems are also applicable to any other environment where the need to track an item situated at a first location is moved to a second location and positioned within a confinement area.

For example, in the context of a warehouse setting, particularly a loading dock, a computing device, such as a tablet, has a loading software application thereon and is used in conjunction with a scanning device by a user during a loading session. For example, as used herein, the user may be a warehouse worker that is a forklift driver or may sometimes be referred to as a loader. The user uses the computing device having the loading software application thereon or operably connected thereto and an associated scanning device, to efficiently track and load items, such as pallets, totes, and/or containers, from a first location, e.g. a loading dock, into a confinement area, e.g. a trailer or vehicle.

The exemplary use in the context of a warehouse is provided for readability purposes only and the present disclosure should not be construed as limited to such use and application. For example, the present disclosure is suitable for any environment in which items are located at a first location and are moved to a second location, including a confinement area, and the movement of such items needs to be tracked and monitored. The present disclosure and associated software application are configured to account for various factors relating to the handling of items based on one or more characteristics or features relating to the item, e.g. weight, item type, chain-of-custody tracking, etc. For example, other uses of the disclosed systems and methods include, without limitation, the tracking of the movement and storage of an item within a building where the building floor has weight thresholds that cannot be exceeded; or the item contains evidence where chain-of-custody needs to be monitored and tracked; or the item is of a perishable nature and alerts are provided to a user during the movement process.

Computing systems of any number or type are suitable for implementing the item loading and tracking systems and performing the methods, techniques, processes, and executing the computer program products, instructions, and/or components described herein. FIG. 1 is an example simplified block diagram for computing system 100. Computing system 100 may include one or more computing devices 102 of the same or different types, and each one or more computing devices 102 may be operably connected to one or more input/output (I/O) devices 108. Computing device is representative of various forms of computing devices, including, without limitation, mainframes, desktops, laptops, workstations, servers, mobile or portable devices, such as personal digital assistants, tablets, smart-phones, cellular telephones, and other computing devices, and may be utilized to execute the various software components and computer program products presented herein.

Computing system 100 may include one or more central processing units (CPU) 104. CPU 104 includes one or more processors reading and/or executing instructions, programs, or applications stored therein, stored in memory 106, stored on computer readable storage media of computing device 102 or of I/O devices 108, or any combination of the foregoing. The one or more processors are also capable of accessing and/or storing data in memory, in processors, and/or computer readable storage media of the computing device or of I/O devices, or combinations of any of the foregoing. CPU is operably connected with memory 106. CPU 104 is also operably connected with I/O devices 108 through any applicable interface component for the corresponding I/O device 108, e.g. port (serial, parallel USB), wire, card (sound, video, network), or the like. Exemplary, and non-limiting, types of CPUs may include general purpose processors, digital programmable devices, microcontrollers, digital signal processors (DSPs), application specific integrated circuit (ASIC), and field programmable gate array (FPGA), or other components and combinations thereof designed to perform the functions described herein. Memory 106 includes data storage, volatile memory, e.g. random access memory (RAM), and non-volatile memory, e.g. read only memory (ROM) or non-volatile RAM (NVRAM), and other types of memory known in the art.

Computing system 100 and computing device 102 may operate in a networked environment using connections to remote computing devices and computing systems through a network 206, such as a local area network (LAN), wide area network (WAN), peer-to-peer networks, grid computing infrastructures, the Internet, and other network types known in the art. I/O devices 108 include various devices that a user may use to interact with computing system 100 or computing device 102. Representative I/O devices 108 include keyboards, touchscreens, mouse and other pointing devices; a visual display device, such as a cathode ray tube, liquid crystal display, screens, touch screens, and other suitable display devices for visually communicating and interacting with the user; audio devices, such as a microphone, headphones, speakers; and print devices for printing, scanning, faxing, and/or transmitting data and images. I/O devices 108 may also include computer readable storage media, e.g. mass storage devices, disks, magnetic disks, optical disks, magnetic tape, flash memory, RAM, ROM, EEPROM, or any other media that can be used to carry or store computer-readable information. I/O devices 108 may also include a communication device for connecting computing system 100 with one or more other computing systems over a network, e.g. wired and/or wirelessly, utilizing one or more communications protocols, e.g. IEEE 802.11, IEEE 802.3, TCP/IP, cellular protocols, any other communications protocols, and combinations thereof. Computing system 100, including computing device 102, may each include one or more communication devices and applicable controller(s) for connecting computing system 100 or computing device 102 with one or more other computing systems and/or computing devices, such that I/O devices 108 are integral with and are part of computing device 102 and not a separate component therefrom, e.g. built-in cameras, microphones, speakers, network connection devices, and other built-in components.

Computing system 100 may include one or more I/O devices 108 of the same type or of different types and combinations thereof and one or more computing devices 102 of the same type or of different types and combinations thereof and all of the foregoing operably connected to each other.

The systems, functions, methods, or algorithms described herein may be implemented in hardware, software, firmware, middleware, or any combinations thereof. When implemented in software, the described methods, processes, techniques may be stored in memory, computer-readable storage media, and/or combinations thereof and transmitted as one or more instructions or code to cause one or more computing systems 100, including any applicable processor(s) to operate in accordance with the teachings of the present disclosure. The operable connection of the various components of computing system 100 described in reference to FIG. 1 include buses, circuitry, wires, wireless, or other connections. The functions, methods, and techniques described herein may be implemented by one or more computing system in cooperation with each other. The components of computing system 100 shown and described, including their relationships and functions, are exemplary and are not to limit the implementation of the systems, methods, techniques, and computer program products described herein.

Referring now to FIG. 2, there is illustrated one embodiment of a real-time feedback tracking system 200. For example, in the context of a warehouse setting, data collected from users performing the loading operations disclosed herein can provide a wealth of information relating to the loading and tracking of items and warehouse operations. For example, as items are loaded into vehicle trailers or other confinement areas, data may be passed by a plurality of mobile computing systems 100 being used by users each performing a loading process to a database 204, the database may be at a remote server 202, over a network 206. As the user loads an item into a confinement area, data is provided in real-time to the database 204 as well as to the user on their respective computing system 100. Data relating to the loading process and each individual item may be stored on database 204 at server 202. This data may also be used or viewed by a supervisor, other individual(s), or organizations monitoring the progress of one or more loading sessions via computing system 102b in real-time or after the loading session has ended, and/or shared with other applications or work-streams at the warehouse. In this way, data is gathered about each item in a warehouse as it is moved, and real-time feedback, including visual and aural feedback, is provided to the user during a loading session, and is shared with and viewable by others in real-time or near-real-time. The information relating to each session is also reviewable after a loading session has ended. The present disclosure helps streamline loading processes as details relating to the items of interest are captured and recorded and helps to reduce opportunities for error.

As will be discussed further herein, feedback in the present systems, methods, and computer program products may be provided in the form of visual indicators. Visual indicators may be rendered in different colors, shapes, patterns, and labels, or any combination of the foregoing to convey certain information to a viewer and/or user of the system and computer program product, including, to distinguish between different types of items, states of the items to be tracked, and states relating to the confinement area(s). Table 1 is illustrative of different colors rendered to convey information regarding the disclosed processes and systems. The present disclosure is not limited to such colors and the visual indicators are configurable based on end-use application of the disclosed systems, methods, and computer program products herein and/or user-preference of the same.

TABLE 1

| Color | Reference numeral in the exemplary figures |
| --- | --- |
| Blue | 3 |
| Orange | 5 |
| Green | 7 |
| Red | 9 |
| Yellow | 11 |
| Purple | 13 |
| Brown | 15 |

Figure 4:
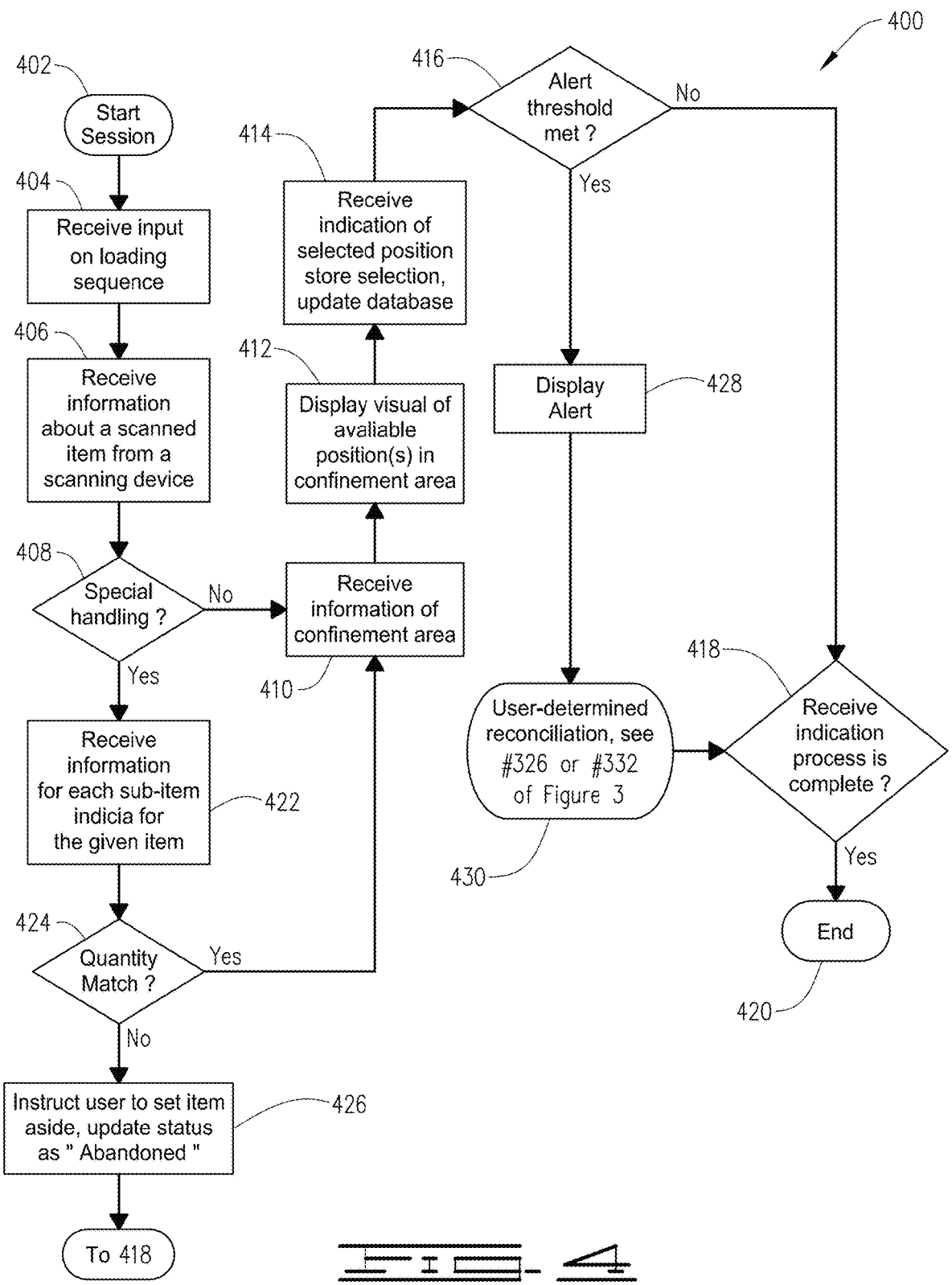
FIG. 4 is an example flow chart illustrating a loading process of the loading computer program product software application for item tracking with real-time feedback.

FIG. 3 illustrated an example flow chart of a loading process 300 mainly from a user's-perspective using a computer program product in the form of a loading software application as part of the loading session for item tracking with real-time feedback. FIG. 4 is an example flow chart illustrating a loading process 400 of the loading software application for item tracking with real-time feedback, mainly from the loading software application's perspective.

Using the loading software application installed or otherwise accessible on computing system 100, for example, mobile computing device 102, a user starts a loading session at block 302 by providing an indication to the loading software application. For example, the mobile computing device 102 is a tablet that is equipped with a touch screen to receive user inputs and convey information to the user. To begin a session, the user launches the loading software application, enters, via typing or scanning a user ID card, the user's access credentials. The loading software application is configured to allow the user to indicate a loading sequence (block 304) and receives input from the user on the loading sequence (block 404). For example, the user may load the items into the confinement area in a reverse-order, such as first-in/last-out, or any other loading order. The loading order and rules related thereto can be pre-programmed into the loading software application, and at blocks 304 and 404, the user indicates to the loading software application and the applications receives such indication, respectively, which loading sequence to use.

FIG. 5 is an exemplary rendering of a dashboard of the loading software application. The right-most side of FIG. 5 illustrates the confinement area, for this example, the body of a trailer and the position of loaded items 120 and a visual rendering of the status of confinement area, illustrated by reference numeral 5. As will be discussed below, visual rendering indicator 5 is indicative of a certain alert to be conveyed to the user. The left-side of FIG. 5 illustrates unloaded items 122 that are staged and ready for loading into confinement area 128. For example, unloaded items 122 may be visually rendered as two-toned and loaded items may be rendered as a single color. Again, the appearance of the visual renders may be configured depending upon end-use application and/or preference of the operating organization. Certain identifying indicia may also be rendered in the dashboard as illustrated in FIGS. 5 and 6. For example, to obtain additional information or details regarding an item, a user may select the desired item via the computing system's graphical user interface or other suitable selection device, see e.g., FIGS. 11A, 11C, and 12B. As illustrated in FIGS. 5 and 6, other information regarding the loading session or the item(s) of interest may be communicated in the dashboard, including, the number of items staged, in progress, voided, the corresponding load number, confinement area/door number, number of items loaded, etc. The dashboard also enables the user to select one or more options, including to toggle between viewing items that are staged or in progress (see, e.g., FIG. 8), the ability to select an option of loading a license plate number (LPN), e.g. an identifier for an item, or unload one or more items. The user is also presented with the option selecting one or more assets 126, e.g., a dolly, or pallet jack, in order to track and monitor the location of such assets in the confinement area. All text appearing on the dashboard is configurable to be displayed in different colors to convey different messages to the user or to alert the user of certain conditions.

For example, as illustrated in FIG. 9A, the user may view a summary of their ongoing loading processes and receive information regarding the loads, confinement areas, and any alerts that may be displayed in different colored text, for example, certain weights depicted in orange text designated by reference numeral 5 or green text designated by reference numeral 7. The user may obtain additional details regarding a load, such as stop details, statuses, etc., by selecting one of the loads to be shown in the exemplary visual rendering depicted in FIG. 9B. The yellow 11 check visual indicator is illustrative to convey to the user that the load is in progress.

The user scans item indicia at block 306 and at 406 the application receives information about a scanned item from a scanning device. Scanning can be achieved by any suitable scanning device, for example, a hand-held scanner or barcode reader. The scanning device is operably connected to and communicates with computing system 100, either by wired connection or wireless connection. Scanning device may also be integral with and a part of computing system 100, for example, a built-in camera. Item indicia corresponds to a physical tag or label associated with each item. Item indicia may be a barcode, QR code, or other printed data, whether readable by humans or a machine. Item indicia contains identifying information corresponding to the particular item, for example, identifying information includes one or more characteristic data relating to and associated with said item, such as an identifier, a status, a type, a weight, a size, a shape, dimensions, a quantity of sub-items, an origin location, a current location, and a destination location. As the item is moved, information regarding that item can be updated to be associated with the given item and/or uploaded to the database.

At blocks 308 and 408, the loading software application determines whether special handling of the scanned item is needed based, in part, on the scanned indicia and any associated characteristic data. Items may be coded in a manner to trigger a special-handling process once the item is scanned. For example, in connection with certain warehouse operations, items (or pallets) that are tobacco products, may require tracking of all sub-items (or totes) within the item.

Figure 7:
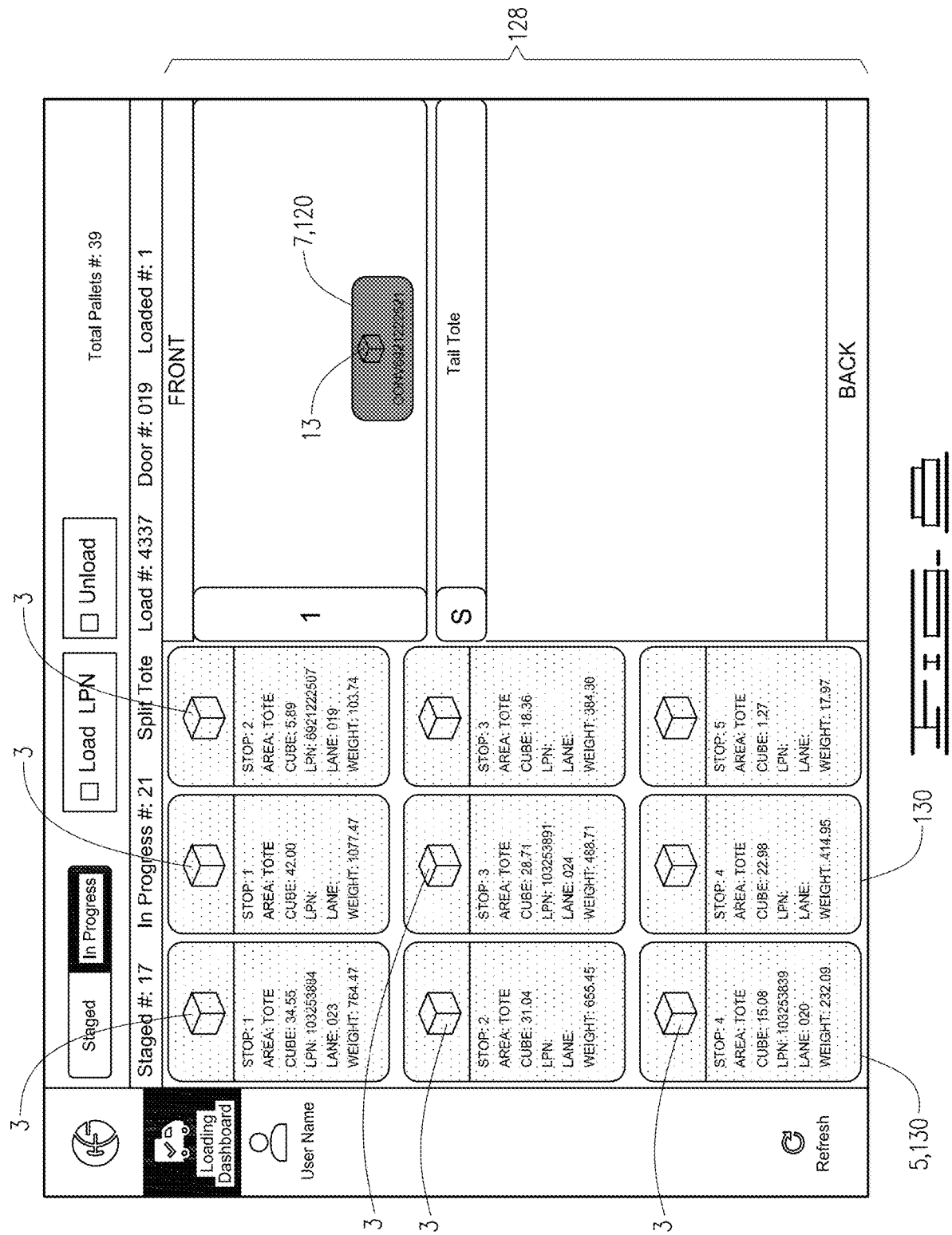
FIG. 7 depicts the locations available in the confinement area for items to be loaded.

If the scanned item does not require special handling, the user will proceed to block 310 upon the visual instruction from the loading software application to scan the indicia associated with a confinement area. Upon scanning the confinement area indicia and after the application receives information regarding the scanned confinement area at block 410, the loading software application at 412, presents a visual display of available positions within the confinement area for the scanned item, as illustrated in FIG. 7. As illustrated in FIG. 7, unavailable positions (dashed border lines) may be greyed out or any other visual rendering that prevents the user from selecting unavailable positions. As illustrated in FIG. 7, the lower left, lower middle, and lower right positions are available for the user to select. At block 312 the user will select, through the touch screen (or pointer) of computing system 100, and the application will receive such selection, as illustrated at block 414, the chosen available location. The user will load the item at the selected location into the confinement area and the application will store the selection and update the applicable database. At block 314 and 416, the loading software application determines if an alert should be raised to the user. If no alert is provided, loading software application will await an indication from the user that the loading session is complete (block 418). If the user indicates the loading session is complete at block 316, then the session will end (blocks 318 and 420) and all information pertaining to the loading session will continue to be stored in database 204. If the user indicates the loading session is not over, then the user will be prompted to scan the next item indicia back at block 306 and the application will receive the information about a scanned item from a scanning device at block 406.

Referring to FIGS. 3, 4, and 12A-12E, at blocks 308 and 408, if an item requires special handling, the loading software application is configured to automatically guide the user through the special handling process associated for that particular item. For example, if the item contains tobacco-products, the special handling process in the application will instruct the user to scan each sub-item indicia for the given item. As addressed briefly above, the item may be a pallet that has one or more sub-items (or totes) thereon. Each sub-item has its own item indicia thereon and associated therewith.

Figure 12A:
Figure 12B:
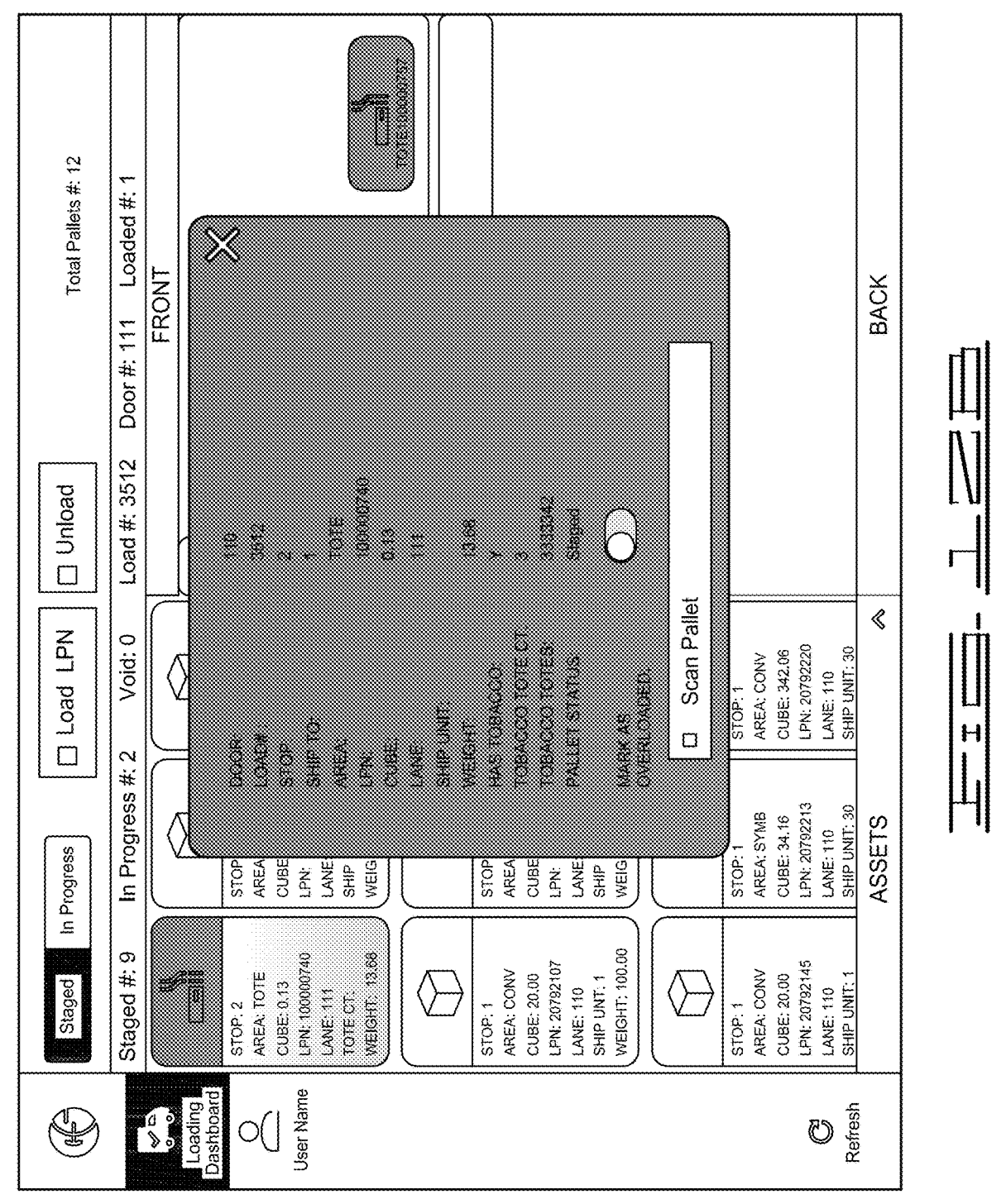
Figure 12C:
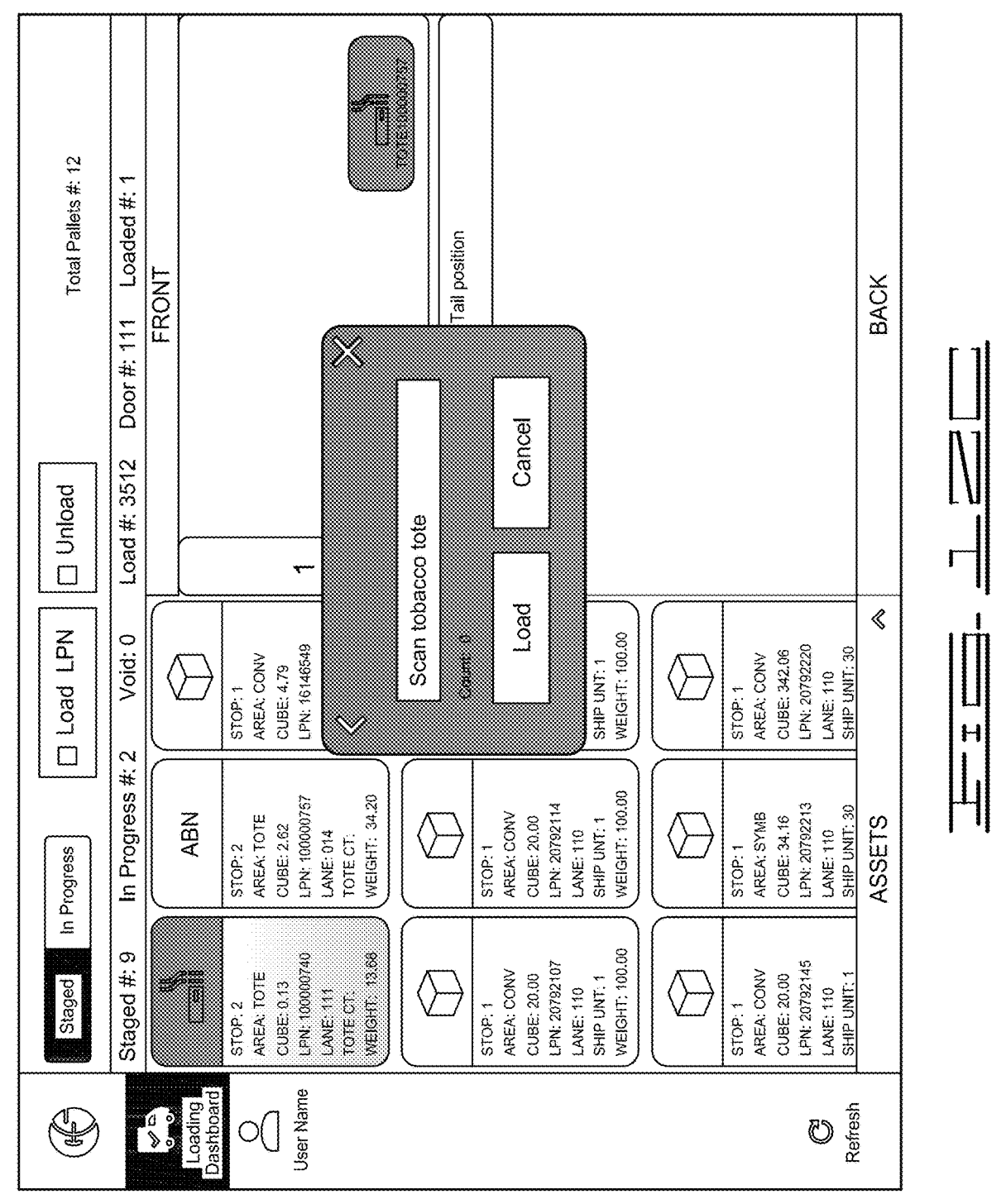

For example, as illustrated in FIG. 12A, the application is configured to provide a visual rendering to the user for the staged tobacco-related items, for example with a cigarette icon and appear yellow in color, designated by reference numerals 122, 136, and 11, respectively. FIG. 12B is illustrative of an additional details screen related to the special-handling item. At block 320, the user scans each sub-item indicia and the application receives the scanned information at block 422. FIG. 12C is illustrative of a prompt for the user to scan the item and/or indicate whether the user will load the item or cancel the prompt.

As the user scans each sub-item indicia, the loading software application program is configured to determine whether the quantity of scanned sub-item indicia matches the expected quantity of sub-items that is associated with the item indicia at blocks 322 and 424. The expected quantity of sub-items is taken from the database and quantity stored and associated with the primary item's characteristic data associated with the item. The loading software application is configured to display to the user the expected quantity of sub-items, see e.g., FIGS. 12B and 12D.

Once the user completes scanning all sub-items and in response to a determination by the loading software application that the quantity of sub-items matches the expected quantity for a given item, the user is presented with a prompt to scan the confinement area, e.g. FIG. 12D. Thereafter, the application may be configured to provide the user a prompt to select the type of item to be moved to the confinement area (not depicted). Then the user is presented with a prompt of available locations within the confinement area for the user to select as illustrated in FIG. 12E and described previously in reference to blocks 310-312 and 410-414 and FIG. 7.

Figure 10:
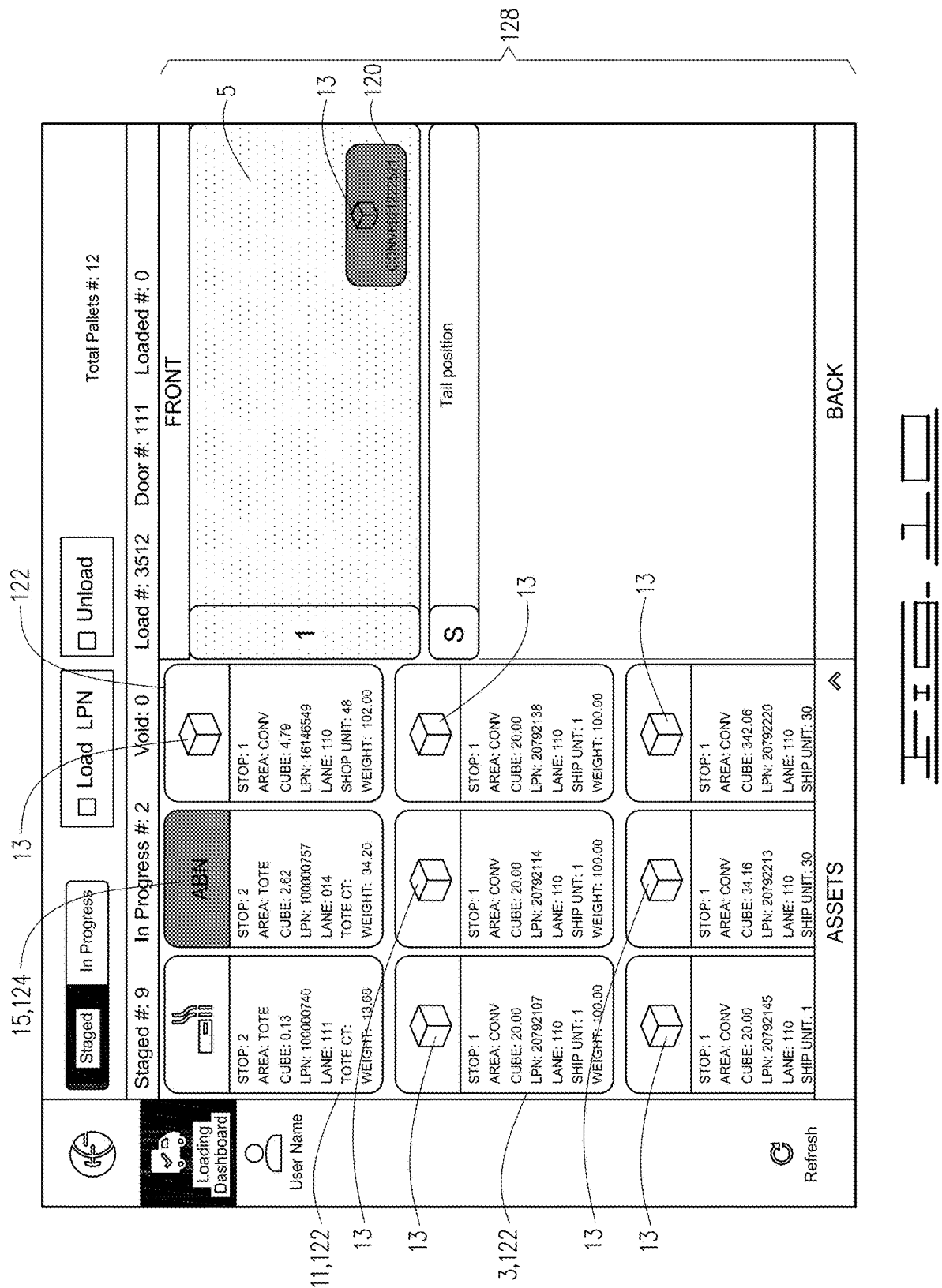
FIG. 10 is an example illustration of the visual display of the loading software application showing a visual alert for the confinement area as well as illustrating the visual indication for different statuses of items, such as an abandoned item, and item requiring special handling.

If, at blocks 322 and 424, the quantity of scanned sub-items does not match the expected quantity, then, at 426, the application will instruct the user to set the item aside, the update the status of the item as "abandoned" and receive such input from the user. At block 324, the user will set the item aside, and update the status of the item, for example, to "abandoned" via the loading software application. This new status is communicated to and saved in database 204. For example, the abandoned item will be rendered in the staged area and marked as "abandoned" and may be rendered in a different color, such as brown, as illustrated in FIG. 10 regarding reference numerals 124 and 15, respectively. The process will then proceed to blocks 316 and 418.

Referring to block 314, if the loading software application determines an alert is needed at block 416, then via the display unit of computing system 100, and, optionally, via the audio output, e.g. speakers, the user is provided with the appropriate alert at block 428. For example, if the confinement area has certain weight restrictions or thresholds, the characteristic data associated with the confinement area has such restrictions and thresholds associated with its corresponding indicia. The database of the item tracking and real-time feedback system contains the values for the weight limits and thresholds.

For example, at block 430 the application is configured to receive the results and indications from the user-determined reconciliation options of blocks 326-332. If the item is loaded into the confinement area and its weight causes an overweight threshold of the confinement area to be met or exceeded, then the user is alerted. For example, at block 332, the user determines how to resolve the overweight confinement area condition and indicates the same to the loading software application in order to update database 204. The process will then proceed back to block 316 and 418.

Figure 11A:
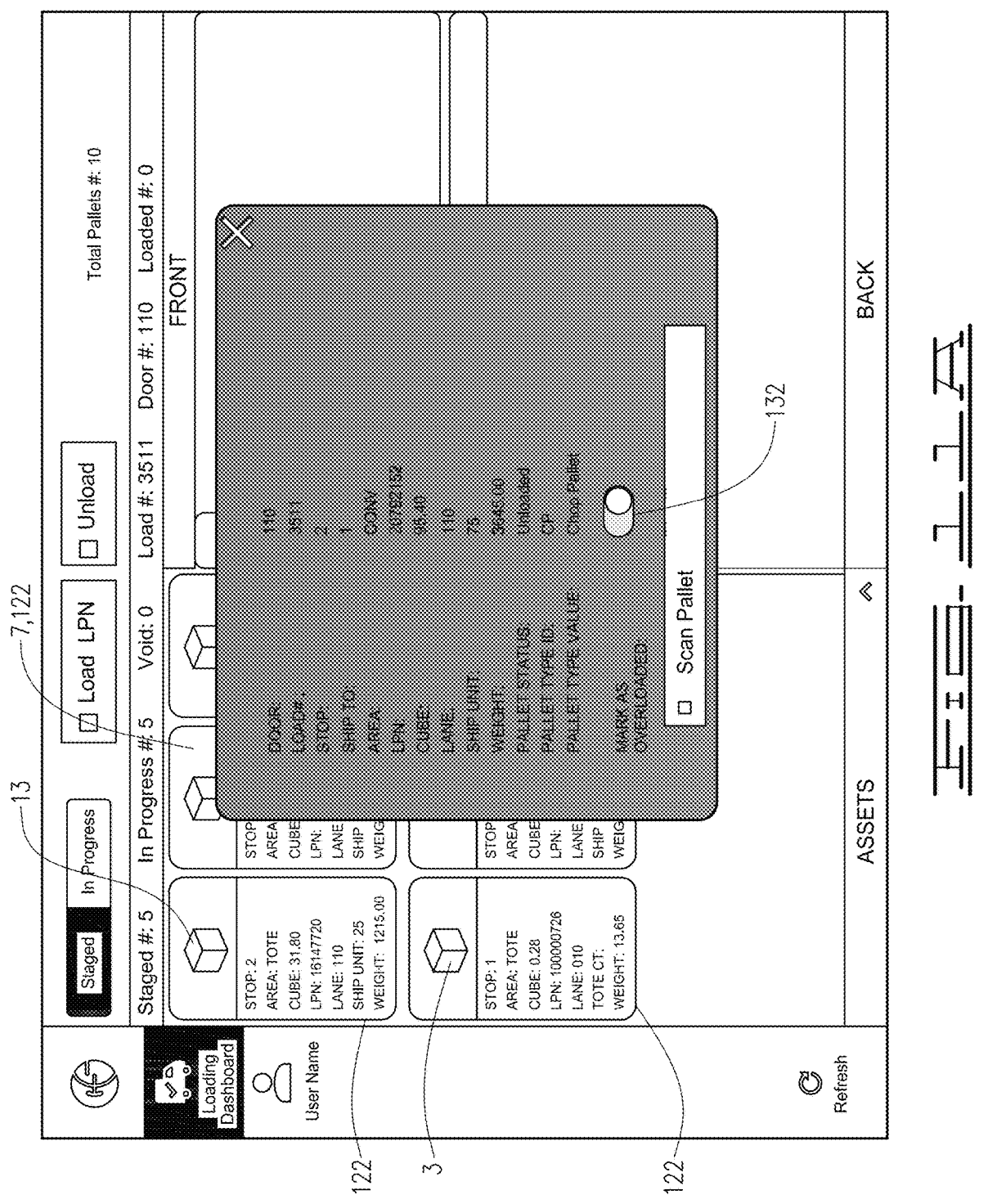
Figure 11:
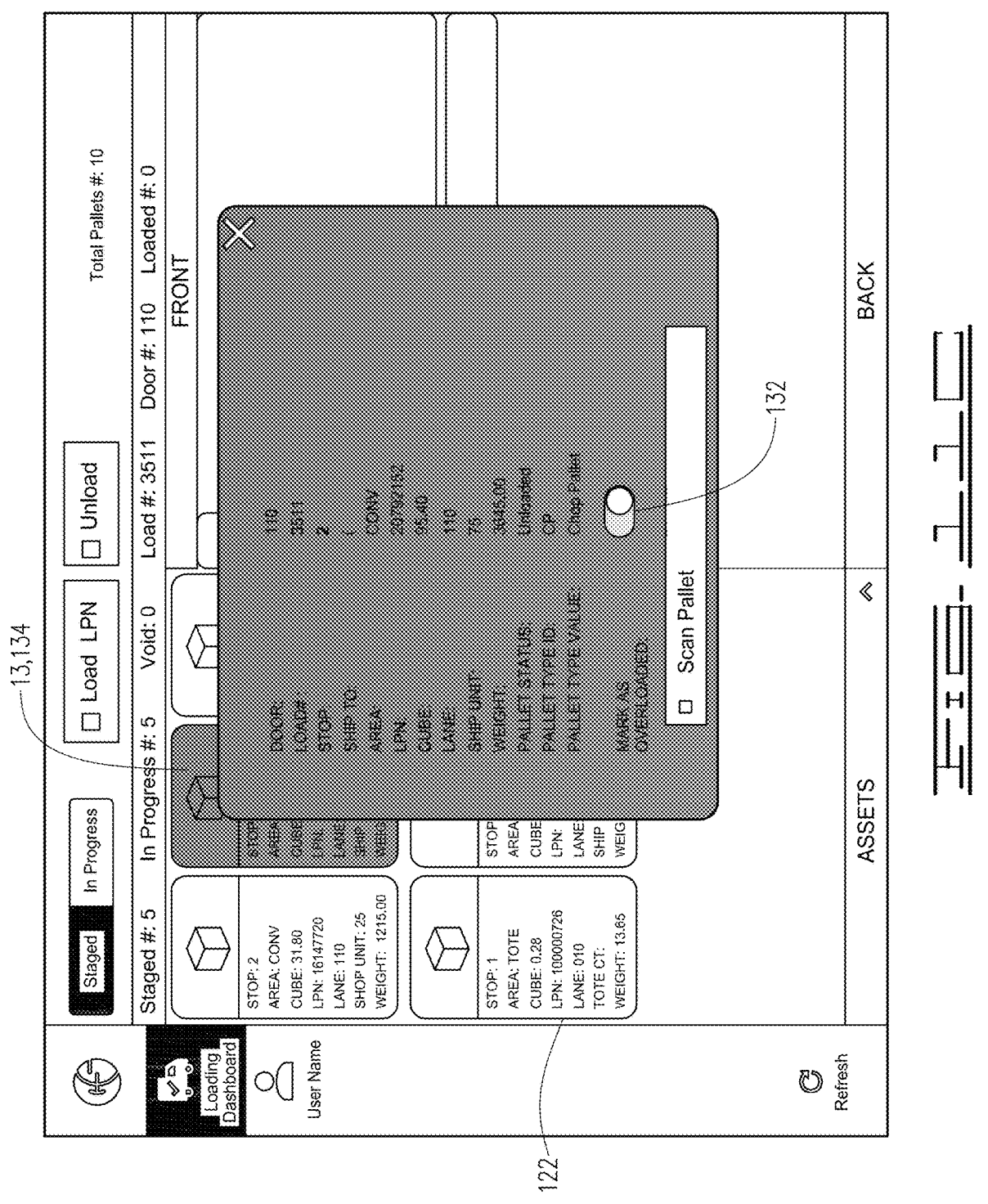

If, for example, the item is an overloaded item, the software application is configured to raise an alert at blocks 314 and 428 to the user so at block 326, the user can take action to resolve the alert. For example, at block 326, the user may return the item back to the first location and update via the display device of computing system 100 the status of the item as "overloaded". As illustrated in FIG. 11A, the user can toggle the "mark as overloaded" button to the right in order to update the characteristic data associated with the item. The application's dashboard is updated in FIG. 11B to illustrate that the overloaded item 134, which may be presented visually in a different two-toned color, such as purple (13) was removed from the confinement area and positioned back at the first location. FIG. 11B illustrates to the user that overloaded item 134 is ready for loading into another confinement area. The user can then proceed to block 316 in connection with a different item. Alternatively, instead of the user returning the item to the first position, the user can optionally proceed to block 328 to locate an alternative confinement area, and block 330 to scan the alternative confinement area indicia. The process will continue as previously described in connection with blocks 312 and 412.

If the item causes an overweight alert to result, then at block 332, the user-determined resolution can be to split the item, remove the item from the confinement area (and return the item at the first location), or find an alternative confinement area for the item. The user will identify which option was selected and communicate that to the application for the applicable updating of the characteristic data for the item in the database. The process then proceeds to block 316 and 418.

FIG. 13 is illustrative of another dashboard that provides an overview of various information available to the users of the computing systems and computer program products described herein. For example, in a warehouse shipping environment, FIG. 13 is illustrative of a view for a shipping office that can review all items that are ready in their respective staging areas or confinement area and applicable status. For example, shading 5 and 7 are indicative of orange and green text, respectively, such that the viewer can quickly see that such status may be within applicable time thresholds set internally by the operating organization.

In connection with the example warehouse environment, the systems, methods, and computer program products described herein can help an organization to efficiently monitor and track items in real-time, reduces error, create operational and cost efficiencies, reduce asset and item loss, enhance safety and compliance operations by helping to ensure items positioned in confinement areas are positioned in a manner that complies with any applicable standards, rules, laws, regulations, and raises corresponding alerts. The systems, methods, and computer program products described herein provide an organization with an ability to monitor multiple areas within an environment simultaneously, capture pertinent data for the organization, and convey information in a user-friendly and intuitive manner.

For example, the disclosed methods, computer systems, and computer program products are not limited to the warehouse setting and can be modified for the intended end-use environment. Such methods, computer systems, and computer program products are configurable to work seamlessly in connection in any environment where the real-time tracking of an item is needed without the need to purchase additional technologies to benefit from the features described herein. Additionally, the present disclosure is configurable to enable customizations of features for an organization and its workstreams, for example, in a warehouse setting, loading sequence enhancements or rules, crossdock enhancements or rules, and pallet area enhancements or rules that are specific to the operations of the facility may be included. Also, if the warehouse includes refrigerated, frozen, perishable, or other temperature-sensitive items to be tracked, corresponding enhancements for handling of the same are possible. Other customizations include, an ability to track, load, and unload multiple bunker pallets, e.g., the bunker pallets are displayed as multiple pallets for the same LPN and are consolidated logically on screen and all are updated in bulk; customizations for the visual renderings of the dashboard screen counts for in progress shorts, staged, loaded, and overload multiple bunker pallets with the same LPN; the prevention of loading pallets that have been voided or are designated as void; and customizing loading and unloading instruction logic to the operator to allow for all left or all right pallets where the lift operator or user can reach during the loading/unloading process.

As previously discussed above, the present disclosure describing use of the system and software application in a warehouse setting is for illustrative purposes only and should not be construed as limiting.

To the extent various third-party software and components are referenced in the present disclosure, such is exemplary and for ease of discussion and readability. The present systems, methods, and computer program products are not limited to such components or software applications; and components and applications capable of performing similar functions to those described herein to achieve the results described herein are likewise suitable The use of ordinal number terminology (i.e., "first," "second," "third," "fourth," etc.) is for the purpose of differentiating between two or more items and is not meant to imply any sequence or order or importance to one item over another or any order of addition. The use of the phrase "or combinations thereof" as used herein refers to all permutations and combinations of the listed items preceding the term. The skilled artisan will understand that typically there is no limit on the number of items or terms in any combination, unless otherwise apparent from the context. The use of the term "or" in the claims is used to mean "and/or" unless explicitly indicated to refer to alternatives only or the alternatives are mutually exclusive, although the disclosure supports a definition that refers to only alternatives and "and/or."

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Although certain steps or logic flows are described herein and/or illustrated in the figures as occurring sequentially, some steps or logic flows may occur simultaneously with each other or in an order that is not depicted or described to achieve the described results. Other steps may be provided, or steps may be eliminated from the described flows, and other components may be added to, or removed from, the various examples of the image analytics systems, methods, and computer program products of the present disclosure.

While various implementations have been described herein, such descriptions are presented by way of example and are not to be limited to the precise descriptions and illustrations. Accordingly, numerous modifications and variations are possible by those skilled in the art without departing from the spirit and scope hereof, as defined by the following and later-submitted claims and their equivalents. The breadth and scope of the present disclosure should not be limited by any of the implementations and illustrations described herein, but should be defined only in accordance with the following and later-submitted claims and their equivalents.

What is claimed is:

1. A computing system comprising:
one or more processors;
one or more computer readable storage media operably coupled to at least one of the processors; and
program instructions stored on the one or more computer readable storage media for execution by at least one of the processors to cause the computing system to perform the actions of:
receiving an electronic communication comprising identifying information associated with an item from a scanning device, wherein the identifying information is stored in an item indicia;
determining whether special handling of the scanned item is required based on the identifying information associated with the item;
displaying, via a graphical user interface, a request to be provided with identifying information corresponding to all sub-items within said scanned item;
determining whether a provided quantity of sub-items matches an expected quantity of sub-items based on a comparison of said quantity of sub-items to the expected quantity of sub-items stored in a database of the system;
displaying, via the graphical user interface, a request to be provided identifying information of a confinement area;
receiving an electronic communication comprising the identifying information associated with said confinement area from the scanning device, wherein the identifying information is stored in a confinement area indicia;
determining one or more available positions for said item within said confinement area based on the identifying information of said confinement area;
displaying, via the graphical user interface, a visual depiction of one or more available positions for said item within said confinement area;
receiving an electronic communication comprising an indication of a selection of a position selected from the visual depiction of the one or more available positions within said confinement area, wherein the electronic communication is stored in the database of the system; and
determining whether a weight threshold associated with said confinement area is met or exceeded based on a comparison of the weight of one or more item positioned within the confinement area to the weight threshold of the confinement area stored in the database of the system; and
displaying, via the graphical user interface, an indication that said weight threshold is met or exceeded.

2. The computing system of claim 1, wherein said identifying information associated with said item includes one or more characteristic data relating to and associated with said item, including: an identifier, a status, a type, a weight, a size, a shape, dimensions, a quantity of sub-items, an origin location, a current location, and a destination location.

3. The computing system of claim 2, wherein the expected quantity of sub-items is the quantity of sub-items in said characteristic data of the identifying information associated with said item stored within the database of the system.

4. The computing system of claim 1, further comprising determining a mismatch between said provided quantity of sub-items and said expected quantity of sub-items based on a comparison of the quantity of sub-items associated with the characteristic data of the identifying information associated with said item to the expected quantity of sub-items in said characteristic data of the identifying information associated with said item that is stored in the database of the system such that the computing system having one or more computer readable storage media having additional program instructions for execution by at least one of the processors to perform the action of displaying, via the graphical user interface, an indication of mismatch.

5. The computing system of claim 1 further comprising: saving said selection of the position selected from the visual depiction of the one or more available positions in said database such that the one or more processors of the computer system execute additional program instructions to remove the selected position from a listing of said one or more available positions within said confinement area from said database.

6. The computing system of claim 1 further comprising: receiving an electronic communication comprising an indication a loading session of one or more items is over, such that the one or more processors of the computer system execute additional program instructions to end the loading session of the one or more items.

7. The computing system of claim 1, wherein the scanning device is a camera, an RFID reader, a bar code reader, or a QR reader.

8. The computing system of claim 1, wherein the confinement area is a trailer.

9. The computing system of claim 1, wherein the item is a pallet.

10. The computing system of claim 1, wherein each sub-item is a tote.

11. A computer-implemented method of tracking an item as it is moved to a confinement area, the method comprising:
receiving, by a computing system executing a loading software application, an electronic communication comprising identifying information associated with the item from a scanning device, wherein the identifying information is stored in an item indicia;
determining, by the computing system executing the loading software application, whether special handling of said item is required based on the identifying information associated with the item;
displaying, via a graphical user interface, a request to be provided with identifying information corresponding to all sub-items within said item,
determining, by the computing system executing the loading software application, whether a provided quantity of sub-items matches an expected quantity of sub-items based on a comparison of the quantity of sub-items to the expected quantity of sub-items stored in a database of the system;
displaying, via the graphical user interface, a request to be provided identifying information of a confinement area;

receiving, by the computing system executing the loading software application, an electronic communication comprising the identifying information associated with said confinement area from the scanning device, wherein the identifying information is stored in a confinement area indicia;

displaying, via a graphical user interface, a visual depiction of one or more available positions for said item within said confinement area;

receiving, by the computing system executing the loading software application, an electronic communication comprising an indication of a selection of a position selected from the visual depiction of the one or more available positions within said confinement area, wherein the electronic communication is stored in the database of the system; and determining, by the computing system executing the loading software application, whether a weight threshold associated with said confinement area is met or exceeded based on a comparison of the weight of one or more item positioned within the confinement area to the weight threshold of the confinement area stored in the database of the system; and displaying, via the graphical user interface, an indication that said weight threshold is met or exceeded.

12. The method of claim 11, wherein identifying information associated with said item includes one or more characteristic data relating to and associated with said item, including: an identifier, a status, a type, a weight, a size, a shape, dimensions, a quantity of sub-items, an origin location, a current location, and a destination location.

13. The method of claim 12, wherein the expected quantity of sub-items is the quantity of sub-items in said characteristic data of the identifying information associated with said item stored within the database of the system.

14. The method of claim 11, further comprising determining a mismatch between said provided quantity of sub-items and said expected quantity of sub-items based on a comparison of the quantity of sub-items associated with the characteristic data of the identifying information associated with said item to the expected quantity of sub-items associated with said characteristic data of the identifying information associated with said item that is stored in the database of the system, such that the method is further comprising: displaying, via the graphical user interface, an indication of mismatch.

15. The method of claim 11, further comprising: saving said selection of the position selected from the visual depiction of the one or more available positions in said database and removing the selected position from a listing of said one or more available positions within said confinement area from said database.

16. The method of claim 11, wherein the scanning device is a camera, an RFID reader, a bar code reader, or a QR reader.

17. The method of claim 11, wherein the confinement area is a trailer.

18. A computer program product for tracking one or more items, the computer program product stored in a computer readable storage medium, comprising program code that, when executed by the computing system, cause the computing system to perform actions comprising:

receiving an electronic communication comprising identifying information associated with an item from a scanning device, wherein the identifying information is stored in an item indicia;

determining whether special handling of the scanned item is required based on the identifying information associated with the item;

displaying, via a graphical user interface, a request to be provided with identifying information corresponding to all sub-items within said scanned item;

determining whether a provided quantity of sub-items matches an expected quantity of sub-items based on a comparison of the quantity of sub-items to the expected quantity of sub-items stored in a database of the system;

displaying, via the graphical user interface, a request to be provided identifying information of a confinement area;

receiving an electronic communication comprising the identifying information associated with said confinement area from the scanning device, wherein the identifying information is stored in a confinement area indicia;

displaying, via the graphical user interface, a visual depiction of one or more available positions for said item within said confinement area;

receiving an electronic communication comprising an indication of a selection of a position selected from the visual depiction of the one or more available positions within said confinement area, wherein the electronic communication is stored in the database of the system; and determining whether a weight threshold associated with said confinement area is met or exceeded based on a comparison of the weight of one or more item positioned within the confinement area to the weight threshold of the confinement area stored in the database of the system;

displaying, via the graphical user interface, an indication that said weight threshold is met or exceeded.

19. The computer program product of claim 18, wherein identifying information associated with said item includes one or more characteristic data relating to and associated with said item, including: an identifier, a status, a type, a weight, a size, a shape, dimensions, a quantity of sub-items, an origin location, a current location, and a destination location.

20. The computer program product of claim 19, wherein the expected quantity of sub-items is the quantity of sub-items in said characteristic data of the identifying information associated with said item stored within the database of the system.

21. The computing program product of claim 18 further comprising: saving said selection of the position selected from the visual depiction of the one or available positions in a database and removing the selected position from a listing of said one or more available positions within said confinement area from said database.

22. The computer program product of claim 18, wherein the scanning device is a camera, an RFID reader, a bar code reader, or a QR reader.

23. The computer program product of claim 18, wherein the confinement area is a trailer.

24. The computer program product of claim 18, wherein the item is a pallet.

25. The computer program product of claim 18, wherein each sub-item is a tote.

26. The method of claim 11 further comprising: receiving an electronic communication comprising an indication a loading session of one or more items is over, such that the one or more processors of the computer system execute additional program instructions to end the loading session of the one or more items.

\* \* \* \* \*